United States Patent [19]

Asano

[11] 4,089,018
[45] May 9, 1978

[54] DATA RECORDING CAMERA
[75] Inventor: Seiji Asano, Okegawa, Japan
[73] Assignee: Fuji Photo Optical Co., Ltd., Omiya, Japan
[21] Appl. No.: 807,292
[22] Filed: Jun. 16, 1977
[30] Foreign Application Priority Data Jun. 16, 1976 Japan .................................. 51-70807

[51] Int. Cl.² ............................................ G03B 17/24
[52] U.S. Cl. .................................................. 354/106
[58] Field of Search ............................... 354/105–108; 355/43; 250/476

[56] References Cited
U.S. PATENT DOCUMENTS 4,001,850  1/1977  Fujita ........................... 354/106 X

FOREIGN PATENT DOCUMENTS 2,604,067  5/1976  Germany ........................... 354/106

*Primary Examiner*—L. T. Hix
*Assistant Examiner*—M. L. Gellner

[57] ABSTRACT

A photographic camera having a focal plane shutter is provided with a data recording device for recording on the film the photographing date or the like. The data recording device consists of a data carrier carrying thereon data representing characters which is operable from outside of the camera to select the data to be recorded, a light source for illuminating the data carrier, and an optical system for projecting an image of the data representing characters onto the film. The optical system includes a light reflecting prism which reflects the light from the data carrier toward the film. The prism is inserted into the optical path of the objective of the camera between the focal plane shutter and the film only when the data recording device is operated. With this arrangement, the data can be recorded while the shutter is closed, and accordingly, the quality of the image of the data recorded is not affected by the shutter speed.

21 Claims, 4 Drawing Figures

DATA RECORDING CAMERA

BACKGROUND OF THE INVENTION

1. Field of the Invention

This invention relates to a photographic camera having built therein a data recording means, and more particularly to a photographic camera with a focal plane shutter having a data recording means for recording the photographing date or the like on the film when the picture is taken.

2. Description of the Prior Art

It has been known in the art to provide a data recording means in a camera body to record data such as the photographing date. It is desirable that the data be viewable through the viewfinder in order that the data to be recorded can be confirmed. The data recording means generally comprises a data carrying member carrying thereon data representing characters which is operable from outside of the camera to select the data to be recorded, and a data projecting optical system to project an image of the selected data onto the film so that the image is recorded thereon.

In a camera having a focal plane shutter (hereinafter referred to as "focal plane shutter camera"), the data recording means has conventionally been disposed in the back cover of the camera, or in front of the focal plane shutter.

When the data recording means is disposed in the back cover of the camera, the data to be recorded is focused on the rear surface of the film loaded in the camera. Therefore, there has been a defect in that the data cannot be recorded in the case of a film provided with a leader paper on the rear surface thereof. Further, since the data carrying member is positioned remote from the optical path of the veiwfinder of the camera, an optical system of quite complicated structure is required to indicate the data to be recorded in the viewfinder.

When the data recording means is disposed in front of the focal plane shutter, the data must be recorded while the shutter is opened. Therefore, the light value of the light from the data carrying members must be controlled in accordance with the exposure time. Especially, when an interior light source is utilized for illuminating the data carrying members, the brightness of the source must be increased when the exposure time becomes short (such as 1/500 sec to 1/1000 sec). This procedure involves great difficulties.

SUMMARY OF THE INVENTION

In light of the foregoing observations and description, the primary object of the present invention is to provide a focal plane shutter camera with a data recording means which does not suffer from the above described defects.

Another object of the present invention is to provide a focal plane shutter camera with a data recording means which is not affected by the exposure time.

Still another object of the present invention is to provide a focal plane shutter camera with a data recording means which facilitates the indication of the data to be recorded on the film in the viewfinder of the camera.

Still another object of the present invention is to provide a focal plane shutter camera with a data recording means having an optical path changing means to direct the image of the data carrying members toward the film loaded in the camera, said optical path changing means being movable and moved into the optical path of the taking lens of the camera only when the data are recorded after photographing, whereby the optical path changing obstructs none or very little of the light beam from the objective.

In accordance with the present invention, the recording means is provided between the focal plane shutter and the film loaded in the camera. The data recording means includes data carrying members carrying thereon data representing characters such as numerals or letters. Generally, the data carrying members comprise a plurality of data carrying discs or the like which are selectively operated to provide a desired combination of the numerals and/or the letters. An image of the selected characters is focused on the film by way of an optical system including an optical path changing means, such as a prism, for reflecting the image toward the film.

The data recording camera in accordance with the present invention is characterized in that at least an optical path changing means is provided between the focal plane shutter and the film loaded in the camera at least when the data recording means is operated. The optical path changing means may be permanently provided within the optical path of the taking lens of the camera between the shutter and the film, or may be movable between its operative position in which it is positioned within the optical path of the taking lens and reflects the image-wise light from the data carrying members, and its inoperative position in which it is retracted from the optical path of the taking lens.

In a preferred embodiment of the present invention, the optical path changing means is automatically moved to its operative position after the trailing curtain has completed its operation and automatically returned to its inoperative position in response to shutter charge or film wind-up operation of the camera. The data recording means may be operated to record the data either manually or automatically after the optical path changing means has been moved to its operative position.

In the data recording camera in accordance with the present invention, the data recording means is disposed between the focal plane shutter and the film as described above. Accordingly, the exposure of the film to the image of the data representing characters can be determined only with relation to the sensitivity of the loaded film without being affected by the exposure time.

Further, since the data recording means, especially the data carrying members, is positioned on the same side of the film as the optical path of the viewfinder, the data to be recorded can be indicated in the viewfinder with an optical system of relatively simple structure.

DESCRIPTION OF THE PREFERRED EMBODIMENT

Figure 1:
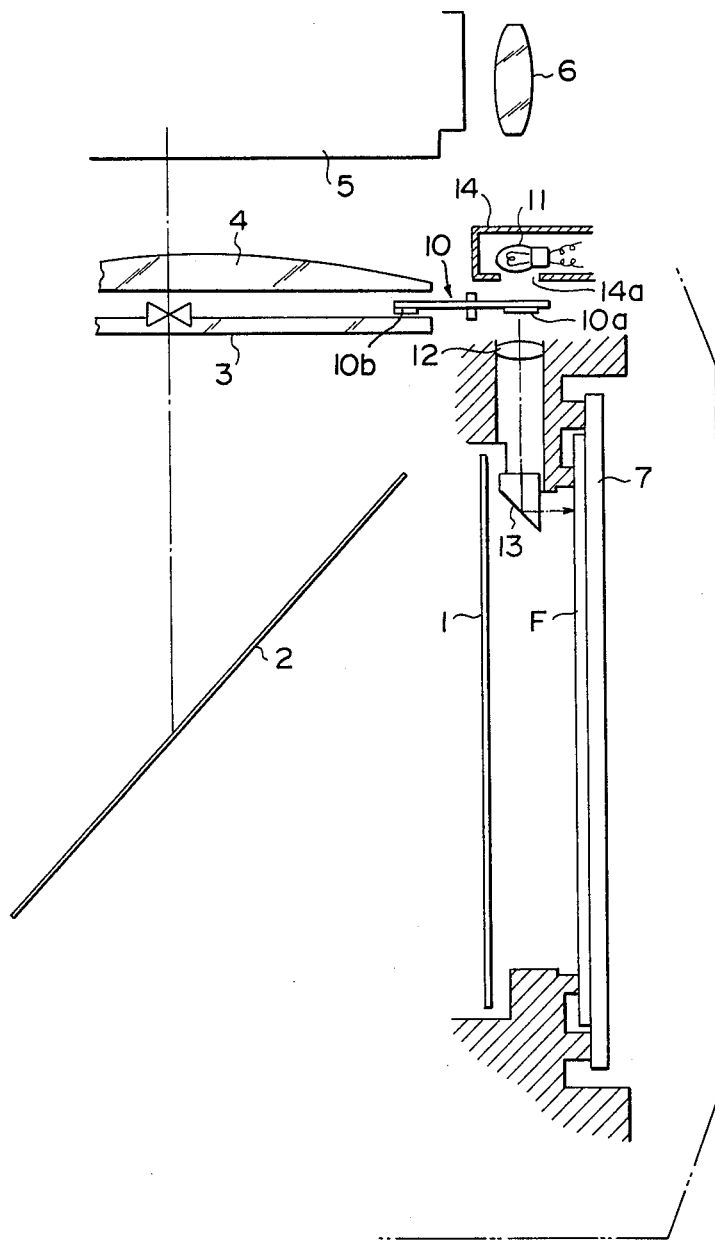
FIG. 1 is a fragmental side sectional view of a photographic camera in accordance with an embodiment of the present invention.

FIG. 1 shows a data recording camera in accordance with an embodiment of the present invention wherein the data to be recorded is viewable through the viewfinder of the camera.

As shown in FIG. 1, the data recording camera of this embodiment is a single lens reflex camera with a focal plane shutter 1 having a viewfinder system comprising a quick return mirror 2, a focusing plate 3, a condenser lens 4, a pentagonal prism 5 and an eyepiece 6. A film F is supported in the focal plane by a film pressure plate 7.

The data recording means employed in this embodiment comprises a data carrying disc 10 carrying thereon data representing characters such as numerals or letters, a light source 11 for illuminating the data carrying disc 10, a focusing lens 12 for projecting an image of the data representing characters onto the film F, and a prism 13 functioning as an optical path changing means to reflect the image-wise light from the data representing characters toward the film F. The data carrying disc 10 may be made by attaching a data carrying film on a disc or by directly embossing or printing data on a disc. The light source 11 is surrounded by a light shielding member 14 having an opening 14a facing the data carrying disc 10 so that almost all the light emitted from the light source 11 is directed toward the data carrying disc 10.

The prism 13 is movable up and down between its inoperative position and operative position, as will be described in greater detail hereinafter. In its operative position, the prism 13 is positioned within the optical path of the light from the objective lens (not shown) of the camera and reflects the image-wise light from said focusing lens 12 toward the film F so that the image of the data representing characters is focused on the film F, preferably in a marginal portion thereof, to be photographically recorded thereon. In its inoperative position, the prism 13 is retracted from the optical path of the objective lens of the camera.

The prism 13 is normally positioned in its inoperative position and is moved to it operative position after the shutter is released. Then the prism 13 is returned to its inoperative position when the shutter is charged. Specifically in this embodiment, the prism 13 is returned to its inoperative position in response to a shutter charge or film wind-up operation of the camera.

The light source 11 is lit to illuminate the data carrying disc 10 to photographically record the image of the data representing characters carried thereon, while the prism 13 is in its operative position. Thus, in the data recording camera of this embodiment, the data are recorded on the film F after the shutter 1 is released. Accordingly, the exposure time of the film or the light value of the data representing characters for recording the data may be determined relative only to the sensitivity of the film F loaded in the camera without being affected by the shutter speed. In this embodiment, the light source 11 is lit for a length of time determined by the sensitivity of the film F.

The data carrying disc 10 carries thereon pairs of identical data representing characters such as numerals 10a and 10b, each pair of which are diametrically opposed to each other. The disc 10 is operable from outside of the camera to selectively position a set of desired characters between the light source 11 and the focusing lens 12 so that the desired data is recorded on the film F. When one set of characters 10a is positioned between the light source 11 and the focusing lens 12, the corresponding set of characters 10b is automatically positioned between said focusing plate 3 and the condenser lens 4 of the viewfinder system of the camera. Accordingly, the same data as those recorded on the film F can be viewed through the viewfinder. Although, in the above embodiment, the data carrying means is shown as a single disc for the convenience of illustration, it may consist of a plurality of discs which can be selectively operated so as to provide any desired combination of characters.

Now, referring to FIG. 2, an example of a mechanism for moving the prism 13 up and down will be described in detail.

Figure 2:
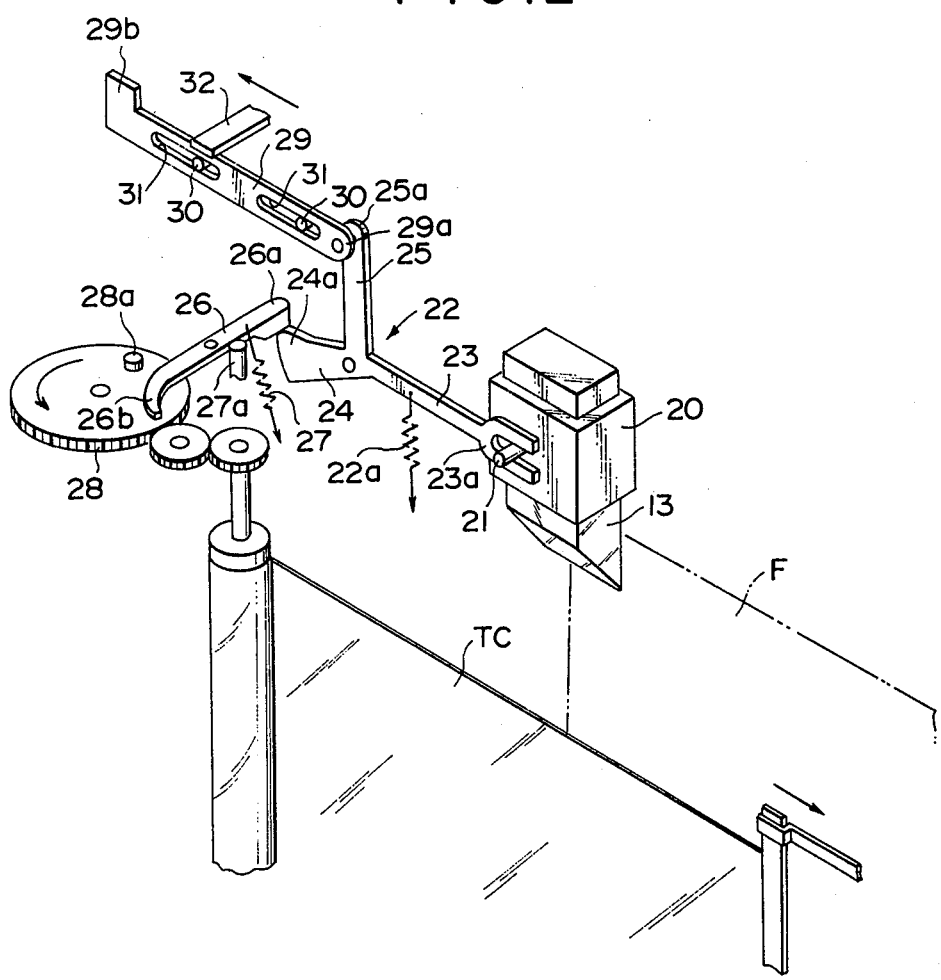
FIG. 2 is a perspective view showing an example of a mechanism for moving an optical path changing means.

As shown in FIG. 2, the prism 13 is held by a support 20 and moved up and down together therewith in a plane parallel to the film F. The support 20 has a stud pin 21 slidably engaged with a forked end 23a of a first arm 23 of a three-armed lever 22. The three-armed lever 22 having three arms 23, 24 and 25 is rotatable and urged in the clockwise direction by a tension spring 22a.

The free end 24a of the second arm 24 is engaged with the first end 26a of a rotatable straight lever 26 to prevent the clockwise rotation of the three-armed lever 22. The straight lever 26 is urged by a spring 27 in the clockwise direction in a plane perpendicular to the plane in which the three-armed lever 22 rotates. The clockwise rotation of the lever 26 is limited by a stopper pin 27a, and when the lever 26 is engaged with the stopper pin 27a, the first end 26a thereof is caused to engage with the free end 24a of the second arm 24 of the three armed lever 22.

The second end 26b of the straight lever 26 is positioned above a shutter charge gear 28. The shutter charge gear 28 is rotated in the counterclockwise direction to charge the trailing curtain TC of the focal plane shutter and is rotated in the clockwise direction when the trailing curtain TC runs to close the aperture. The upper surface of the gear 28 is provided with a fixed pin 28a which engages with the second end 26b of the straight lever 26 upon rotation of gear 28.

Accordingly, when the trailing curtain TC has run to close the aperture and the gear 28 is rotated in the clockwise direction, the fixed pin 28a pushes the second end of the straight lever 26 to cause the lever 26 to rotate in the counterclockwise direction overcoming the force of the spring 27. When the lever 26 rotates in the counterclockwise direction, the first end 26a thereof is removed from engagement with the free end 24a of the second arm 24 of the three-armed lever 22 thereby permitting the clockwise rotation of the lever 22. Then the lever 22 rotates in the clockwise direction by means of the force of the spring 22a to move the prism 13 downward together with the support 20 by way of the engagement between the stud pin 21 and the forked end 23a of the lever 22.

Thus, the prism 13 is moved downward to its operative position when the trailing curtain TC of the focal plane shutter has run to close the aperture.

To the free end 25a of the third arm 25 of the three-armed lever 22 is rotatably connected a slidable lever 29 at one end 29a thereof. The slidable lever 29 is slidably guided by means of a pair of fixed pins 30 received in a pair of elongated openings 31 formed in the lever 29. On the other end of the lever 29 is a projection 29b which is adapted to be engaged with a bar 32 which is moved leftward in response to the film wind-up movement of a film wind-up lever (not shown) in the camera.

The slidable lever 29 is pulled rightward when the three-armed lever 22 rotates in the clockwise direction and is held in the right side position until the bar 32 moves leftward upon operation of the film wind-up lever. When the bar 32 moves leftward, the bar 32 pushes the projection 29b of the slidable lever 29 to cause the lever 29 to slide leftward thereby pulling the third arm 25 of the three-armed lever 22 overcoming the force of the spring 22a. Accordingly, the lever 22 rotates in the counterclockwise direction and moves the prism 13 upward.

Simultaneously with the leftward movement of the slidable member 29, said gear 28 is rotated in the counterclockwise direction to charge the trailing curtain TC. Accordingly, the straight lever 26 is permitted to rotate in the clockwise direction by the force of the spring 27 and is brought into engagement with the second arm 24 of the lever 22 again. Thus, the prism 13 is moved to its inoperative position when the film is wound up.

The light source 11 may be manually energized while the prism 13 is in its operative position or may be automatically energized when the prism 13 is moved to its operative position. In the latter case, it is preferable to provide a switch means to make the data recording means inoperative when the data is not desired to be recorded.

Figure 3:
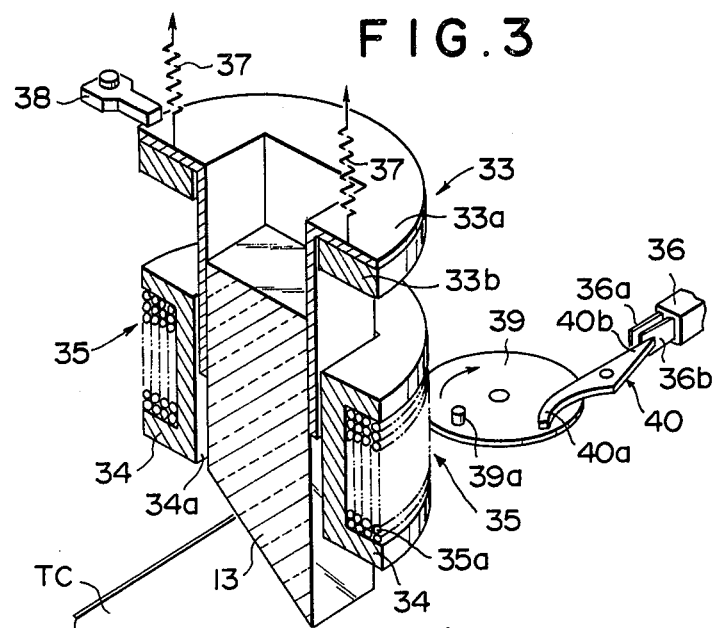
FIG. 3 is a perspective view showing another example of a mechanism for moving an optical path changing means partly in cross-section with the optical path changing means in its inoperative position.
Figure 4:
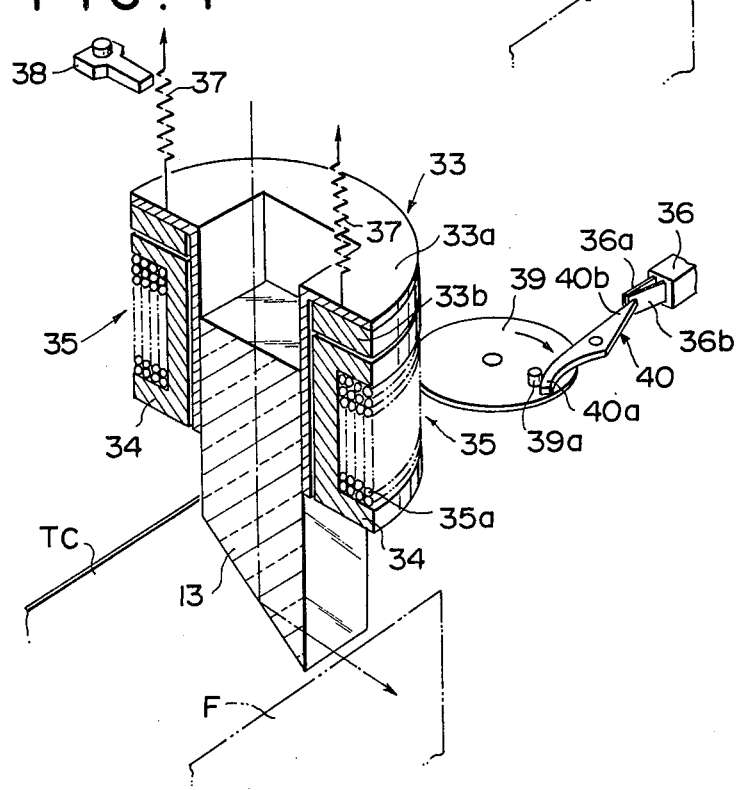
FIG. 4 is a view similar to FIG. 3 wherein the optical path changing means is in its operative position.

Another example of a mechanism for moving the prism 13 up and down employing an electromagnetic means is shown in FIGS. 3 and 4.

In this example, the prism 13 is held by a support 33 formed of a nonmagnetic material and is moved up and down together therewith. The support 33 is slidably accommodated in the opening 34a formed in an iron core 34 of a solenoid 35. A coil 35a is wound around the core 34. The coil 35a is connected to an electric source (not shown) through a switching means having a pair of contacts 36a and 36b. The support 33 has an enlarged peripheral flange 33a formed on the upper end thereof. To the lower face of the flange 33a is secured an annular iron ring 33b. The support 33 is urged upward by a pair of springs 37 and its upward movement is limited by means of the engagement between the upper face of the enlarged flange 33a and a stationary stopper member 38 in the camera body.

When the coil 35a is not energized, the support 33 is held in its upper position by the force of the springs 37 where the prism 13 is positioned in its inoperative position retracted from the optical path of the objective lens of the camera as shown in FIG. 3. When the coil 35a is energized by way of the contacts 36a and 36b of the switch means put into contact with each other, the iron ring 33b is attracted to the iron core 34 by an electromagnetic force large enough to overcome the force of the springs 37 to move the support 33 downward thereby moving the prism 13 to its operative position as shown in FIG. 4.

The switch means 36 is closed when the trailing curtain of the focal plane shutter runs as will be described hereinbelow. Similarly to FIG. 2, on the upper surface of the shutter charge gear 39 is a fixed pin 39a. The pin 39a pushes an end 40a of a lever 40 which is rotatably supported adjacent to the gear 39 to rotate the lever 40 in the counterclockwise direction, when the gear 39 is rotated in the clockwise direction upon running of the trailing curtain of the focal plane shutter. When the lever 40 is rotated in the counterclockwise direction, the other end 40b thereof pushes the contact 36b of the switch means 36 so that the contacts 36a and 36b are put into contact with each other. Thus, the coil 35a is energized and the prism 13 is moved to its operative position.

When the gear 39 is rotated in the counterclockwise direction to charge the shutter again, the contact 36b returns to its original position by the resilience thereof to open the switch 36.

Thus, the coil 35a is deenergized and the prism 13 is returned to its inoperative position by the force of the springs 37.

In this embodiment, the coil 35a remains energized until the film wind-up lever is wound up. Therefore, it is preferable to provide an additional switch means to stop the supply of the electric current to the coil 35a when recording of the data is finished or in response to deenergization of the light source 11 to save the consumption of electric power.

I claim:

1. A photographic camera with a data recording means including an objective lens system for focussing an image on a photosensitive film loaded in the camera, a shutter means disposed between said objective lens system and said film, and a viewfinder system for viewing the object to be photographed, wherein said data recording means comprises a data carrying means carrying thereon data representing characters, a light source means for illuminating said data carrying means and a data projecting optical system for projecting an image of said data representing characters onto said film so that the image is photographically recorded thereon, said data projecting optical system including an optical path changing means for changing the direction of the light from said data carrying means toward the film which is positioned between the film and said shutter means within the optical path of said objective lens system at least when the data recording means is operated, said data carrying means being operable from outside of the camera to select the data to be recorded.

2. A photographic camera as defined in claim 1 wherein said optical path changing means is movable from an operative position to an inoperative position and is provided between the film and the shutter means within the optical path of the objective lens system to direct the light from the data carrying means toward the film when it is in the operative position, and is retracted from the optical path of the objective lens system when it is in the inoperative position.

3. A photographic camera as defined in claim 2 wherein said optical path changing means is positioned in the inoperative position at least when the shutter means is opened.

4. A photographic camera as defined in claim 3 wherein said optical path changing means is moved to the operative position in response to closure of the shutter means.

5. A photographic camera as defined in claim 4 wherein said optical path changing means is returned to the inoperative position when the recording of the data is finished.

6. A photographic camera as defined in claim 5 wherein said light source means is an electric lamp which is energized for a time interval required for photographically recording the data and determined relative to the sensitivity of the film loaded in the camera, and said optical path changing means is returned to the inoperative position in response to deenergization of the lamp.

7. A photographic camera as defined in claim 4 wherein said optical path changing means is returned to the inoperative position in response to a film wind-up operation of the camera.

8. A photographic camera as defined in claim 2 wherein said optical path changing means is moved by a mechanical means comprising a driving means for driving said optical path changing means which is movable between first and second positions and urged by a spring means toward the first position, a locking means for normally preventing the movement of the driving means toward the first position opposing the force of the spring means and permitting the movement in response to closure of the shutter means, and a reset means to return the driving means to the second position in response to a film wind-up operation of the camera, said optical path changing means being adapted to be positioned in the operative position when said driving means is in the first position and to be positioned in the inoperative position when said driving means is in the second position.

9. A photographic camera as defined in claim 8 wherein said locking means is caused to prevent the movement of the driving means toward the first position.

10. A photographic camera as defined in claim 2 wherein said optical path changing means is moved by an electromagnetic means comprising a magnetically attractive support means operatively connected to the optical path changing means so as to move together therewith and urged by a spring means toward a first position, an electromagnetic driving means for attracting said support means toward a second position when energized, and a switch means connected to the electromagnetic driving means by way of an electric power source, said optical path changing means being positioned in the operative position when the support means is in one of the positions, and being positioned in the inoperative position when the support means is in the other position.

11. A photographic camera as defined in claim 10 wherein said optical path changing means is positioned in the inoperative position when the support means is in the first position, and positioned in the operative position when the support means is in the second position.

12. A photographic camera as defined in claim 11 wherein said switch means is closed in response to closure of the shutter means to energize the electromagnetic driving means.

13. A photographic camera as defined in claim 12 wherein said switch means is opened in response to a film wind-up operation of the camera.

14. A photographic camera as defined in claim 13 wherein said light source means is an electric lamp which is energized for a time interval required for photographically recording the data and determined relative to the sensitivity of the film loaded in the camera, and said switch means is opened in response to deenergization of the lamp.

15. A photographic camera as defined in claim 12 wherein said switch means is opened when the recording of the data is finished.

16. A photographic camera as defined in claim 10 wherein said electromagnetic driving means includes an iron core having a hollow center and a winding wound around the core, and said support means comprises an elongated support body formed of a nonmagnetic material and an iron ring secured to the support body adjacent to one end thereof so as to be attracted by the core, said support body being slidably accepted in said hollow center of the core to move back and forth therethrough.

17. A photographic camera as defined in claim 16 wherein said support body includes a center recess for accepting said optical path changing means and the optical path changing means is fixed in the recess.

18. A photographic camera as defined in claim 2 wherein said optical path changing means is a light reflecting means.

19. A photographic camera as defined in claim 18 wherein said light reflecting means is a prism.

20. A photographic camera as defined in claim 1 wherein said data carrying means includes pairs of identical data representing characters the members of each pair of which are positioned relative to each other so that when one data representing character of the pair is positioned to be recorded, the other character of the pair is automatically positioned to be viewed through the viewfinder of the camera.

21. A photographic camera as defined in claim 20 wherein said data carrying means includes a plurality of data carrying members separately operable to provide a desired combination of the characters carried thereon.

* * * * *